United States Patent [19]

Ferrieu et al.

[11] 4,414,434
[45] Nov. 8, 1983

[54] ELECTRONIC SUBSCRIBER LINE INTERFACE CIRCUIT HAVING MEANS TO EQUALIZE CURRENT THROUGH THE OUTPUT DIFFERENTIAL AMPLIFIER

[75] Inventors: Gilbert M. M. Ferrieu, Bievres; Etienne J. R. Osmond; Yves J. F. Hetet, both of Lannion, all of France

[73] Assignee: Telecommunications Radioelectriques et Telephoniques T.R.T., Paris, France

[21] Appl. No.: 249,283

[22] Filed: Mar. 30, 1981

[30] Foreign Application Priority Data

Apr. 18, 1980 [FR] France ............... 80 08770

[51] Int. Cl.³ ............................................. H04M 19/00
[52] U.S. Cl. ........................................ 179/77; 179/70; 179/18 FA; 323/315
[58] Field of Search ............... 179/77, 70, 18 FA; 323/315, 316, 349

[56] References Cited

FOREIGN PATENT DOCUMENTS 2024504 1/1980 United Kingdom .

Primary Examiner—Stafford D. Schreyer
Attorney, Agent, or Firm—Thomas A. Briody; William J. Streeter

[57] ABSTRACT

In this subscriber line interface circuit which comprises a pair of amplifiers whose outputs are connected to the subscriber's line, the input terminals of these amplifiers receive by means of negative feedback voltages having opposite phases depending on the transversal current I produced by the line interface circuit and independent of the longitudinal currents I accidentally produced on the subscriber's line. The two load impedances, which are connected between the supply terminals of the amplifiers and the terminals of a d.c. voltage supply source are controlled by means of their control terminals by voltages which have the same characteristics as the voltages applied to the input terminals of the amplifiers but which in addition have been shifted with a certain shift voltage $V_z$. Consequently, the amplifiers of the line interface circuit operate completely independent of the longitudinal currents.

6 Claims, 3 Drawing Figures

ELECTRONIC SUBSCRIBER LINE INTERFACE CIRCUIT HAVING MEANS TO EQUALIZE CURRENT THROUGH THE OUTPUT DIFFERENTIAL AMPLIFIER

The invention relates to a subscriber's line interface circuit comprising a pair of amplifiers the output terminals of which are connected to two wires of the subscriber's line, the input terminals of which receive by negative feedback two voltages which are in phase and in anti-phase with the voltage at the terminals of an impedance through which a sum current flows which is equal to the weighted sum of the currents which enter and leave the subscriber's line with substantially equal weighting coefficients and, finally, the supply terminals of which are connected to a d.c. voltage source by means of two load impedances.

BACKGROUND OF THE INVENTION

It is known that a subscriber line interface circuit is a device intended to connect a subscriber's line to a telephone exchange. One of the functions of a line interface circuit is the supply of a d.c. current to the subscriber's line. An electronic subscriber line interface network of the type described in the opening paragraph is disclosed in U.S. Pat. No. 4,275,277. This line interface circuit is of such a construction that it operates in practice as a transmission bridge which is connected to the d.c. voltage source and has a resistance which is in a perfect balance with respect to the two wires of the subscriber's line, this balance being independent of the longitudinal currents which may happen to occur on the subscriber's line. By controlling the sum current and/or the impedance through which this sum current flows, it is possible to adjust the resistance of the transmission bridge of the connecting network to a specified value without modifying its balance.

In order to prevent a large amount of a power to be dissipated in the amplifiers which supply the d.c. current to the subscriber's line and to facilitate the integration of the line interface circuit, it was recommended in U.S. Pat. No. 4,292,735 to arrange two load resistors between the two supply terminals of the amplifiers and the two terminals of the supply source. These two resistors have for their object to acquire a portion of the d.c. voltage drop to be produced by the line interface circuit. In said patent these load resistors are dipoles the impedance of which depends on the current flowing through them. When, however, a longitudinal current is accidentally produced in the subscriber's line there flows through one of these dipoles the transversal current produced by the connecting circuit, increased by the longitudinal current while through the other dipole there flows the transversal current decreased by the longitudinal current. The result is that these two dipoles do not produce the same voltage drop and that for a certain intensity of the longitudinal current one of the dipoles produces a voltage drop of such a high value that correct operation of the amplifier to which it is connected is prevented. Thus, when load resistors in the form of dipoles are used, the proper operation of the connecting network is disturbed when there is a longitudinal current which exceeds the transversal current supplied by the line interface circuit by 20 to 30%.

It is an object of the invention to avoid these limitations in the good performance of the line interface circuit by using load resistors the value of which is substantially independent of the longitudinal current.

BRIEF SUMMARY OF THE INVENTION

According to the invention, a subscriber's line interface circuit of the type described in the preamble comprises means for forming two control voltages for the said load impedances, one of which is formed by shifting with a predetermined shift voltage, the voltage at the terminals of the said impedance to which the sum current flows, the other impedance being in anti-phase with the first control voltage, these control voltages being applied to the two load impedances with the same phase as the voltages applied to the input terminals of the two corresponding amplifiers, these load impedances comprising a voltage follower circuit for producing at the two supply terminals of the corresponding amplifiers voltages which are substantially equal to the control voltages.

BRIEF DESCRIPTION OF THE DRAWINGS

Embodiments of the subscriber's line interface circuit according to the invention will now be further explained by way of non-limitative examples with reference to the drawings in which.

DETAILED DESCRIPTION OF THE PREFERRED EMBODIMENT

Figure 1:
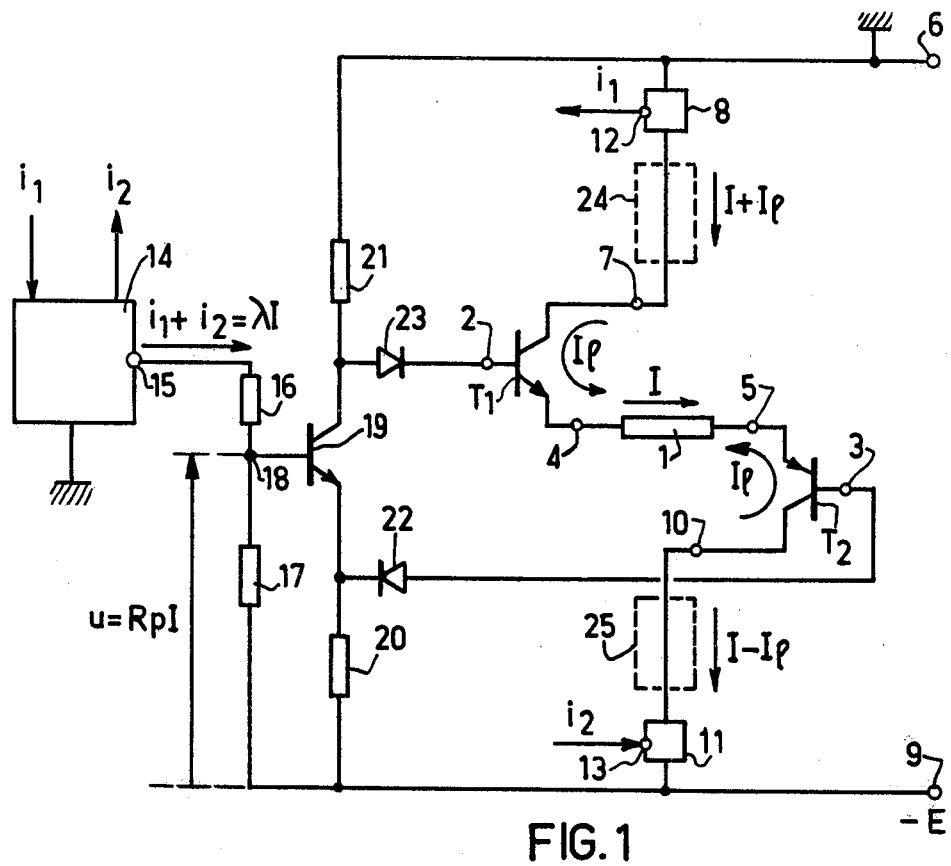
FIG. 1 is a circuit diagram of a prior art line interface circuit.

An electronic subscriber line interface circuit of the type described in U.S. Pat. No. 4,275,277 poses a problem which will now be explained on the basis of the circuit diagram of FIG. 1. This circuit diagram shows the arrangement of the elements of this line interface circuit by means of which the loop direct current I circulates in the subscriber's line 1 in the direction indicated by the arrow. It is of no importance for understanding the problems and their solution in accordance with the invention to include in this circuit diagram the elements by means of which it is possible to have the loop current circulate in the other direction and which have been described in the above-mentioned patent applications.

To apply the loop current to the subscriber's line, the line interface circuit comprises two amplifiers which are formed, in the example shown, by a npn transistor $T_1$ and a pnp transistor $T_2$. Transistors $T_1$ and $T_2$ composite transistors. The bases of transistors $T_1$ and $T_2$ form inputs 2 and 3 respectively of the two amplifiers. The emitters of transistors $T_1$ and $T_2$ form the outputs 4 and 5 respectively of the two amplifiers and these outputs are connected to two wires of the subscriber's line 1. The collectors of transistors $T_1$ and $T_2$ form the terminals 7 and 10 via which the two amplifiers are supplied with power. Terminal 7 is connected to the positive terminal 6 of a power supply source by means of a circuit 8, which functions as a current mirror circuit. This positive terminal 6 is connected to the ground potential 0. Terminal 10 is connected to the negative terminal 9 of the supply source by means of circuit 11, which functions as a current mirror circuit. Negative terminal 9 is connected to the potential $-E$ (of, for example, $-48$ V).

The currents from the collectors of transistors $T_1$ and $T_2$ flow through current mirrors 8 and 11. These mirror circuits are of a construction which resembles the construction of complementary transistors, in order to generate at their output terminals 12 and 13 currents $i_1$ and $i_2$ which are proportional to the currents flowing through them and which have the same proportionality constant ($\lambda/2$) lower than 1, which is alternatively denoted the weighting coefficient.

The two currents $i_1$ and $i_2$ are applied to the curcuit 14, which forms the sum current $i_1$ and $i_2$ and which may comprise, before forming this sum current, means for compensating for the differences between the weighting coefficients of the current mirrors 8 and 11. A terminal of the circuit 14 is connected to ground and at its output terminal 15 there appears the current sum $i_1+i_2$ which flows to negative terminal 9 across the series-arranged resistors 16 and 17. The sum current produces a voltage drop u at the terminals of load resistor 17, one end of which is connected to negative terminal 9. The other terminal 18 of this resistor 17 is connected to the base of npn transistor 19, the emitter of which is connected to negative terminal 9 across the resistor 20 and the collector to the positive terminal 6 across the resistor 21, which has the same resistance value as the resistor 20. Via the diode 22 the emitter of transistor 19 is also connected to the input terminal 3 of the amplifier formed by transistor $T_2$, and via diode 23 the collector of the transistor 19 is connected to the input terminal 2 of the amplifier formed by transistor $T_1$.

There now follows a description of the main properties of the above-described line interface circuit which are useful for a proper understanding of the invention. The sum current $i_1+i_2$ depends only on the transversal current I and does not depend on the longitudinal currents in the subscriber's line; this sum current may be written $i_1+i_2=\lambda I$. The voltage u at the terminals of the resistor 17 having the value R amounts to $u=\lambda RI$. The voltages at the input terminals 2 and 3, which are O and $-E$, respectively, in the absence of the transversal current I in the subscriber's line, become $-u$ and $-E+u$, respectively, owing to the negative feedback path formed by transistor 19 and diodes 22 and 23. Neglecting the voltage drop in the base-emitter diodes of transistors $T_1$ and $T_2$, these voltages $-u$ and $-E+u$ are also present at the terminals 4 and 5 connected to the subscriber's line. Thus, the connecting network behaves as a transmission bridge which in order to have the current I circulate in the subscriber's line, produces voltage drops of an absolute value u between terminal 4 and positive terminal 6 of the supply source and between terminal 5 and negative terminal 9 of the voltage source. These two voltage drops produced by the connecting network are equal to the voltage drop u at the terminals of resistor 17. Hereinafter the equivalent resistance of the transmission ratio of the connecting network relative to each terminal 6 and 9 of the voltage source will be denoted $R_p$. From this it follows that:

$$u=R_p I \quad R_p=\lambda R \tag{1}$$

With the line interface circuit described so far a comparatively large power can be dissipated in the amplifiers formed by the transistors $T_1$ and $T_2$. If the resistance of the subscriber's line is denoted W, the voltage drop to be produced by the line interface circuit is $2u=E-WI$. Neglecting the voltage drop in the current mirrors 8 and 11, this voltage drop is completely produced in the emitter-collector paths of the transistors $T_1$ and $T_2$. It is high when the lines are short (W is small) and then entails a considerable power dissipation in the transistors $T_1$ and $T_2$, which is a disadvantage when a wholly integrated line interface circuit on a semiconductor body is desired.

To obviate this drawback, U.S. Pat. No. 4,292,735 proposes to arrange two dipoles 24 and 25, which are shown by means of broken lines in FIG. 1, in the current path of the collectors of transistors $T_1$ and $T_2$. These two dipoles have for their function to produce a portion of the voltage drop E-WI, the power dissipation being produced partly in a resistor, in such manner that the voltage drop in the emitter-collector paths of transistors $T_1$ and $T_2$ are reduced and just sufficient to ensure that the speech currents which modulate the current I are transmitted. Each dipole is formed by means of an active circuit controlled by the current flowing through the dipole to obtain convenient impedance values. This solution is satisfactory as long as the loop current I, generated by the line interface circuit does not superimpose itself on the longitudinal currents which are untimely generated in the subscriber's line. In the presence of a longitudinal current $I_l$ the current $I+I_l$ flows through, for example, dipole 24 and the current $I-I_l$ flows through the dipole 25. As mentioned in the foregoing, the voltages at the bases of transistors $T_1$, $T_2$ remain fixed at $-u$ and $-E+u$, respectively, independent of the longitudinal current $I_l$; in contrast therewith, since the dipoles 24 and 25 have an impedance which depends on the intensity of the current flowing through them, the voltage at the collector of transistor $T_2$ is increased and the voltage at the collector of transistor $T_1$ is decreased. When the longitudinal current $I_l$ reaches a predetermined intensity to the order of 20 to 30% of the intensity of the normal loop current I, the voltage at the collector of transistor $T_1$ attains the voltage $-u$ at its base and this transistor $T_1$ is saturated, which results in particular in that the speech currents are no longer transmitted by the line interface circuit.

It is an object of the present invention to avoid this limitation of the performance of the line interface circuit by arranging in the collector current path of the transistors $T_1$ and $T_2$ load resistors comprising a control terminal for controlling their impedance value by means of a suitably chosen voltage instead of dipoles whose impedance value is controlled only by the current flowing through them.

Figure 2:
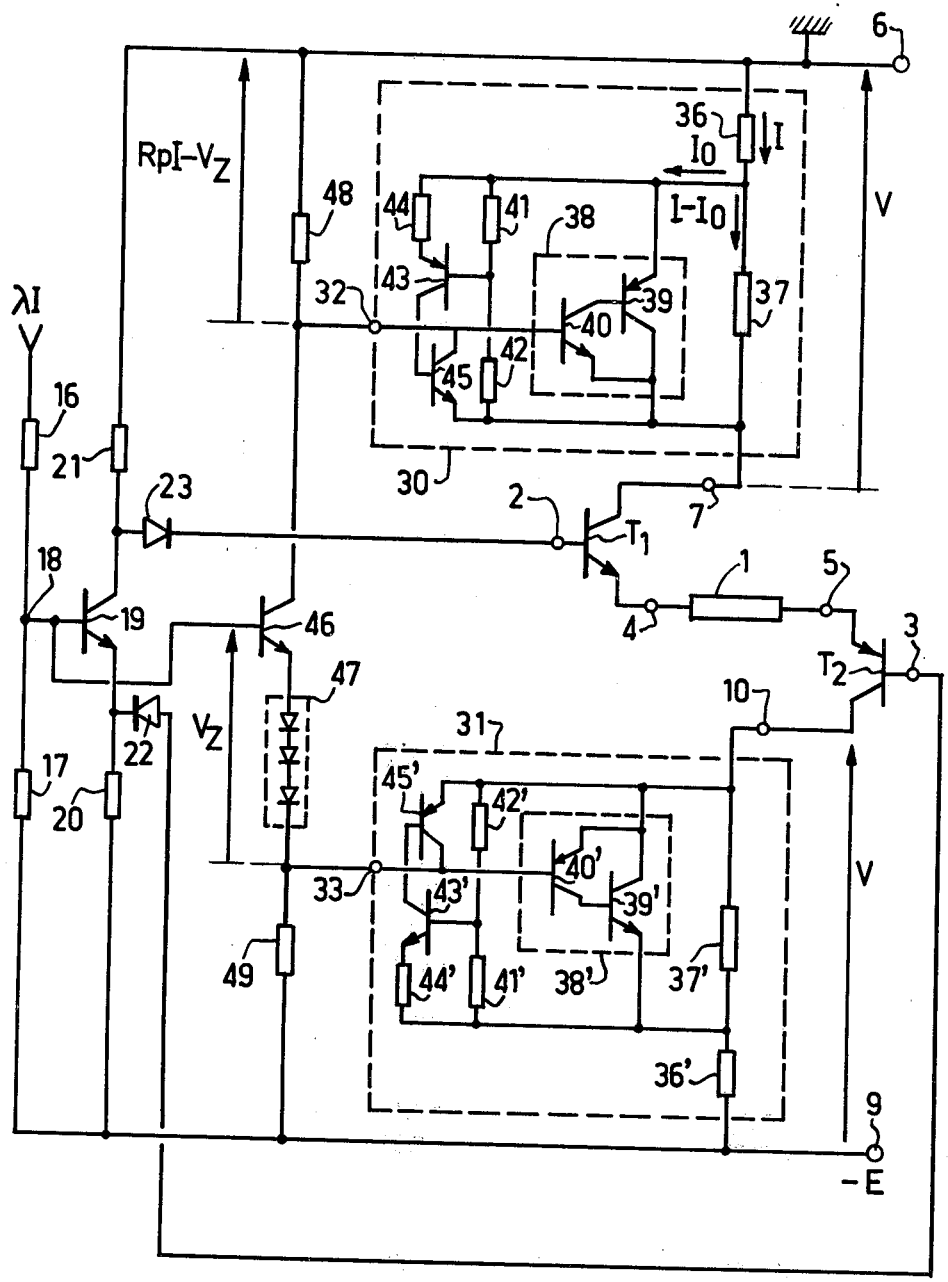
FIG. 2 is a circuit diagram of the line interface circuit according to the invention.

A subscriber's line interface circuit comprising such load resistors is shown in FIG. 2. FIG. 2 also includes a certain number of elements of FIG. 1, referenced in the same manner. To simplify the Figure, the circuits by means of which the sum current $i_1+i_2=\lambda I$ flowing through the resistor 17 to produce there the voltage drop $u=R_p I$ are not shown in the Figure. Included between the supply terminals 7 and 10 of the transistors $T_1$ and $T_2$ and the terminals 6 and 9 of the voltage source there are the load impedances 30 and 31 having control terminals 32 and 33 respectively, to control the value of these load impedances with the voltages derived from voltage u.

The load impedance 30 comprises two resistors 36 and 37, which are arranged in series and are connected between the positive terminal 6 of the voltage source and the supply terminal 7 of the transistor $T_1$. The load impedance 30 also comprises a composite transistor 38 formed by an npn transistor 40 and a pnp transistor 39, which are connected as shown in the Figure. This composite transistor 38 is of the same type as the input transistor 40. The base of the composite transistor 38 is constituted by the base of the transistor 40, which is connected to the control terminal 32. The emitter of the composite transistor 38 is constituted by the emitter of the transistor 40, which is connected to terminal 7. The main current path of the composite transistor 38 is formed by the emitter-collector path of the transistor 39, which is connected to the terminal of resistor 37. Finally, the load impedance 30 comprises a voltage divider which is connected to the terminals of resistor 37 and is formed by the two series-arranged resistors 41 and 42. The base of the pnp transistor 43 is connected between the resistor 41 and 42, its emitter is connected to the output terminal of the resistor 36 across the resistor 44 and, finally, its collector is connected to the base of the npn transistor 45. Transistor 45 has its collector and its emitter connected to the base and emitter respectively of the transistor 40.

The load impedance 31, which is connected between the negative terminal 9 of the voltage source and the supply terminal 10 of the transistor $T_2$ is formed in a similar manner by means of components which have the same reference numerals, but primed, as the corresponding components of the input impedance 30. It will be clear to one skilled in the art that the transistors of the load impedances 30 and 31 are of the complementary type.

To produce the two voltages which are applied to the control terminals 32 and 33 of the load impedances 30 and 31 an npn transistor 46 is used, the base of which is connected to the junction 18 between the resistors 16 and 17, the emitter to the negative terminal 9 of the voltage source across a circuit 47 formed by a certain number of diodes which are arranged in series with a resistor 49, and the collector to the positive supply terminal 6 across the resistor 48, which has the same value as the resistor 49. The terminals of the resistors 48 and 49 which are not connected to the supply terminals are connected to the control terminals 32 and 33 of the load impedances 30 and 31. The transistor 46 connected in this way makes it possible to produce at the terminals of the resistors 48 and 49 two voltages of equal amplitudes and opposite phases when its base is driven by a voltage which is of a sufficient value to have a current circulate in its emitter-collector path. The voltage applied between the base of the transistor 46 and the negative supply terminal 9 is the voltage $u=R_pI$ present at the terminals of the resistor 17. When the substantially constant threshold voltage produced by the flow of a current in the series-arranged diode circuit 47 and in the base-emitter diode of the transistor 46 which is denoted $V_z$ no current will circulate in the emitter-collector path of the transistor 46, until the situation is obtained that $R_pI > V_z$. For the case in which $R_pI \leq V_z$, the voltages at the terminals of the resistors 48 and 49 have zero value. In the case where $R_pI > V_z$, the voltages at the terminals of the resistors 48 and 49 have the same absolute values $R_pI - V_z$ and are of the opposite phase.

There now follows a detailed description of the behaviour of the load impedance 30 in response to the voltage at the terminals of the resistor 48 which is applied between its control terminal 32 and the positive supply terminal 6. Let it first be assumed that the transversal current i does not flow in the subscriber's line. When the current I in the subscriber's line is such that $R_pI \leq V_z$, or $I \leq I_o$, assuming that $I_o = (V_z/R_p)$ no voltage is generated at the control terminal 32 of the transistor 46, which is in the non-conducting state; the composite transistor 38 is then saturated by the current produced in the base of the transistor 40 across the resistor 48. The voltage drop in the main current path of the composite transistor 38, that is to say between the emitter and the collector of the transistor 39, is substantially equal to a voltage drop in the base-emitter diode of transistor 40. Generally, the substantially constant voltage drop in a diode will be denoted $V_d$ hereinafter. When the resistor 36 through which the line current I flows has the value r, it will be seen that for small/line currents such as $I \leq I_o$, the voltage drop V produced by the load impedance 30 may be written:

$$V = rI + V_d \qquad (2)$$

As the total voltage drop between the supply terminal 6 and terminal 4 of the line interface circuit which is connected to the subscriber's line amounts to $R_pI$ the voltage $V_{CE}$ between the collector and the emitter of the transistor $T_1$ has, for the case in which $I \leq I_o$, the value:

$$V_{CE} = R_pI - (V_d + rI) \qquad (3)$$

Figure 3:
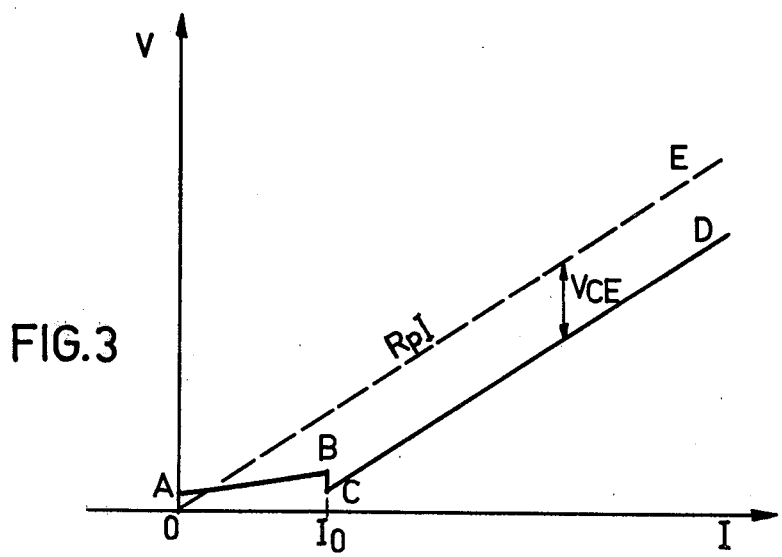
FIG. 3 is a diagram which shows the voltage drop in the load impedance.

The characteristic of the voltage drop V in the load impedance 30 versus the line current I, for $I \leq I_o$, is shown in FIG. 3 by the curve portion AB in accordance with formula (2). Furthermore, the dashed half-line OE in this Figure represents the total voltage drop $R_pI$ between the terminal 4 and 6. The difference between the ordinates of the curves OE and AB therefore represents the voltage $V_{CE}$ between the collector and the emitter of the transistor $T_1$ in accordance with formula (3). For the point B which corresponds to the current $I_o$, it can be easily verified that this voltage $V_{CE}$ is defined by $(V_{CE})B = V_z - V_d - rI_o$.

For the currents I in the subscriber's line such as $I > I_o$, the voltage at the control terminal 32 is $-(R_pI - V_z)$. The composite transistor 38 is no longer saturated and operates as a voltage follower amplifier in such manner that at the emitter of the transistor 40 (that is to say of the composite transistor 38) the voltage $-(R_pI - V_z) - V_d$ is present, the term $-V_d$ being caused by the voltage drop in the base-emitter diode of the transistor 40. The voltage drop V at the terminals of the load impedance 30 then amounts to:

$$V = R_pI - V_z + V_d \qquad (4)$$

From this it can be derived that the voltage $V_{CE}$ between the collector and the emitter of the transistor $T_1$ has the value:

$$V_{CE} = R_pI - V = V_z - V_d \qquad (5)$$

The characteristic of the voltage drop V for $I > I_o$ is shown in FIG. 3 by the straight line portion CD in accordance with formula (4). It should be noted that the two curves AB and CD are not exactly in agreement for the current $I_o$, the difference between the constant ordinates between the points B and C being the small value $rI_o$. The constant difference between the ordinates between the curves OE and CD is the result of the fact that the voltage $V_{CE}$ between the collector and the emitter of the transistor $T_1$ is constant and independent of the line current I, as is shown by formula (5). It is therefore possible to set the voltage $V_C$ to a low value without the risk that transistor T₁ is saturated by the variable speech currents, this low value being, for example, to the order of 2 Volts by adjusting the voltage V$_z$ which determines by the series-arranged diode circuit 47. A very low power is then dissipated in the transistor T₁.

The major portion of the power to be dissipated in the line interface circuit must therefore be dissipated in the load impedance 30 and it is highly advantageous when this power is dissipated for the major part in a resistance. A recommended value for the resistor 37 is then the value R$_p$−r, which is low with respect R$_p$, r being the value of the resistor 36. Generally, the voltage v at the terminals of the resistor 37 may be written:

$$v = R_p(I - I_o) + V_d - rI$$
$$= I(R_p - r) + V_d - R_pI_o$$

When the resistor 37 has a value R$_p$−r, the current i flowing through it amounts to $$i = I - I_o \frac{R_p}{R_p - r} + \frac{V_d}{R_p - r}$$

Neglecting the term [V$_d$/(R$_p$−r)] and neglecting r before R$_p$, it can be seen that the current i in the resistor 37 is exactly I−I$_o$ and that the current flowing through the composite transistor 38 is substantially equal to the constant value I$_o$. Thus, for the currents flowing in the subscriber's line which are much higher than the current I$_o$, the major part of the power to be dissipated in the line interface circuit is dissipated in the resistor 37.

There now follows a description of the behaviour of the load impedance 30 and the line interface circuit at a longitudinal current I$_l$ which is randomly produced in the subscriber's line simultaneously with the transversal current I supplied by the line interface circuit. As has been described with reference to FIG. 1 then there circulates, for example, a current I=I$_l$ between the supply terminal 6 and the terminal 4 of the connecting network through the load impedance 30 and the emitter-collector path of the transistor T₁. But the longitudinal current I₁ has no influence on the relative voltages between the electrodes of the transistor T₁. As described in the foregoing, the voltage drop U=R$_p$I at the terminal of resistor 17 is independent of the longitudinal current I$_l$, which results in that the voltage −u=−R$_p$I at the base of transistor T₁ is independent of the longitudinal current I$_l$. The voltage at the collector of transistor T₁ is the result of the voltage drop V in the load impedance 30 and, in accordance with formula (4), this collector voltage of T₁ amounts to −V=−u+V$_z$−V$_d$. It will then be obvious that the voltage at the collector of transistor T₁ is independent of the longitudinal current I$_l$. Finally, formula (5) shows that the voltage between the collector and the emitter of transistor T₁ is constant. Thus, with a load impedance 30 which is controlled in the above-described manner, the operation of transistor T₁ is substantially not affected by the longitudinal current I$_l$ up to approximately the value of the current I produced by the line interface circuit in the subscriber's line. It should be noted that in the load impedance 30 the longitudinal current I$_l$ must be absorbed by the composite transistor 38 to keep the voltage at the collector of transistor T₁ substantially constant.

The load impedance 31, which is connected between the collector and the negative terminal 9 of the voltage source is controlled by the voltage at its control terminal 33 functions in a similar manner as the load impedance 30 and has the same properties. A voltage drop V as shown in FIG. 3 is produced between its terminals; it produces a constant voltage V$_z$−V$_d$ between the emitter and the collector of transistor T₂. Finally, the operation of this last-mentioned transistor is not affected by a longitudinal current I$_l$.

Up to now no attention has been paid in the description of the operation of the load impedance 30 and 31 to the elements 41 to 45 and 41' to 45'. These elements are only made operative in special cases, for example during short-circuiting of the line or when the current I in the subscriber's line exceeds a predetermined maximum permissible intensity. It is then necessary to protect the transistors T₁ and T₂, to which this current flows, from too high a power dissipation. The voltage drop V at the terminals of the load impedance 30 increases versus the current I in the subscriber's line and for the maximum permissible intensity of this current the voltage at the terminals of the resistor 41 is sufficient to render transistor 43 conductive, which results in saturation of the transistor 45. The current then presents at the base and at the emitter of the transistor 40 is then insufficient to produce a base current, which results in that the composite transistor 38 is rendered non-conductive and does no longer apply a predetermined voltage to the collector of transistor T₁. The impedance connected to the collector of transistor T₁ is then practically the resistance 37 in series with resistance 36 and this transistor T₁ becomes saturated so that the high current flowing through it only produces a relatively low power dissipation.

In addition, it is possible to use a thermistor as the resistance 37, this thermistor having for its object to limit the current flowing through the line interface circuit and particularly through the transistor T₁ when the intensity of the current in the subscriber's line is too high. This thermistor behaves as a resistor having the above mentioned values in the range of the normal currents in the subscriber's line. Above a certain value of the current in the subscriber's line greater than the current which renders the composite transistor 38 non-conductive and saturates the transistor T₁, the power dissipated in the thermistor 37 becomes sufficiently large to cause it to suddenly acquire a high resistance value which causes the current flowing through the line interface circuit to decrease to a considerable extent.

The operation of the load impedance 31 at an accidentally occurring exceedingly high current intensity in the subscriber's line is identical to the operation of the load impedance 30 and has the same effects on the power dissipated in the transistor T₂ and on the current flowing through the line interface circuit.

What is claimed is:
1. A subscriber's line interface circuit comprising:
a pair of load impedance circuits,
a d.c. voltage supply source,
a pair of amplifiers, a first respective output terminal of each of said pair of amplifiers being connected one amplifier to one wire, the other amplifier to the other wire of two wires of said subscriber's line, a respective supply terminal of each of said pair of amplifiers being connected one amplifier to one load impedance circuit and the other amplifier to the other load impedance circuit of said pair of load impedance circuits, respective input terminals of said pair of amplifiers receiving by means of negative feedback respective voltages which are in phase and in anti-phase with a voltage at respective control terminals of said pair of impedance circuits through which a sum current flows which is equal to a weighted sum of currents which enter and leave the subscriber's line with substantially equal weighting coefficients and the supply terminals of said pair of amplifiers each being connected to said d.c. voltage supply source by means of said respective load impedance circuits, said interface circuit further comprises means for forming two control voltages one for each of said load impedance circuits, a first control voltage which is formed by shifting with a predetermined shift voltage the voltage at the control terminal of one of said impedance circuits to which the sum current flows, the control voltage of the other of said impedance circuits being in anti-phase with the first control voltage, a corresponding amplifier in each of said impedance circuits, said control voltages being applied to said respective load impedance circuits with the same phase as the voltages applied to the input terminals of said corresponding amplifiers, said respective load impedance circuits further comprising a voltage follower circuit for producing at said respective supply terminals of said corresponding amplifiers, voltages which are substantially equal to said control voltages.

2. A subscriber line interface circuit as claimed in claim 1, wherein the said shift voltage is selected for producing in the range of the currents in the subscriber's line, a predetermined voltage difference between the supply terminal and the input terminal of each amplifier of the line interface circuit.

3. A subscriber line interface circuit as claimed in one of the claims 1 or 2, wherein said voltage follower circuit in each load impedance circuit is formed a composite transistor, the base of which receives one of the said control voltages, the emitter being connected to the supply terminal of one of the said amplifiers, the collector being connected to a terminal of the direct current source across a resistor having a low ohmic value with respect to a value of a resistor of a resistance bridge of said line interface circuit and finally the emitter and the collector being interconnected by means of a resistor which has a resistance value which is near the value of the resistor of the resistance bridge of the line interface circuit.

4. A subscriber line interface circuit as claimed in claim 3, wherein said resistor which is connected between the emitter and the collector of the transistor forming the voltage follower circuit has a resistance value which is equal to the difference between the value of the resistor of the resistance bridge of the line interface circuit and the value of the resistor connected to the emitter of the said transistor.

5. A subscriber line interface circuit as claimed in claim 4, wherein said resistor connected between the emitter and the collector of the said voltage follower circuit is a thermistor the resistance value of which increases suddenly with respect to the maximum permissible current supplied by the line interface circuit.

6. A subscriber line interface circuit as claimed in claim 1, wherein said load impedance circuit comprises means to detect when a maximum current supplied by said line interface circuit is exceeded and to block said voltage follower circuit when the exceeding of this current is detected.

* * * * *